United States Patent
Song (10) Patent No.: US 9,555,510 B2
(45) Date of Patent: Jan. 31, 2017

(54) BODY PANEL ASSEMBLY AND A METHOD FOR MANUFACTURING A BODY PANEL ASSEMBLY

(71) Applicant: GM GLOBAL TECHNOLOGY OPERATIONS LLC, Detroit, MI (US)

(72) Inventor: Guangling Song, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 455 days.

(21) Appl. No.: 14/136,844

(22) Filed: Dec. 20, 2013

(65) Prior Publication Data

US 2014/0101920 A1 Apr. 17, 2014

Related U.S. Application Data

(62) Division of application No. 13/220,371, filed on Aug. 29, 2011, now Pat. No. 8,632,118.

(51) Int. Cl.
*B23P 19/04* (2006.01)
*B21D 39/02* (2006.01)
(Continued)

(52) U.S. Cl.
CPC ............ *B23P 19/04* (2013.01); *B21D 39/021* (2013.01); *B62D 25/10* (2013.01); *B62D 27/026* (2013.01); *Y10T 29/49622* (2015.01); *Y10T 29/49826* (2015.01); *Y10T 29/49888* (2015.01); *Y10T 29/49908* (2015.01); *Y10T 156/1034* (2015.01)

(58) Field of Classification Search
CPC ........ B21D 39/02; B21D 39/021; B23P 19/04; B62D 27/026; B62D 25/10; Y10T 29/49888; Y10T 29/1034
See application file for complete search history.

(56) References Cited

U.S. PATENT DOCUMENTS

| 6,000,118 A | * | 12/1999 | Biernat | ................. | B21D 39/02 |
| | | | | | 156/196 |
| 2010/0072785 A1 | * | 3/2010 | Wang | ................. | B62D 25/105 |
| | | | | | 296/193.11 |
| 2011/0131778 A1 | * | 6/2011 | Jang | .................... | B21D 39/021 |
| | | | | | 29/243.58 |

FOREIGN PATENT DOCUMENTS

CN 101619643 1/2010
JP 2008265655 A 11/2008

OTHER PUBLICATIONS

Chinese Patent and Trade Mark Office, Office Action for Chinese Patent Application 201210311506.5, mailed Apr. 15, 2016.

* cited by examiner

*Primary Examiner* — Jacob Cigna
*Assistant Examiner* — Lee A Holly
(74) *Attorney, Agent, or Firm* — Lorenz & Kopf, LLP (57) ABSTRACT

A body panel assembly and a method for manufacturing a body panel assembly are disclosed herein. In a non-limiting embodiment, the body panel assembly includes, but is not limited to, an inner panel having a lower portion. The body panel assembly further includes an outer panel that is connected to the inner panel. The outer panel has a main portion, a transitional portion, and a bent portion. The main portion and the bent portion are positioned on opposite sides of the lower portion. The main portion, the transitional portion, and the bent portion are arranged to form a cavity having an elongated configuration below the inner panel. The bent portion defines an opening extending therethrough. The opening is positioned at least partially below the lower portion of the inner panel. The opening provides ventilation to the cavity.

20 Claims, 7 Drawing Sheets

(51) Int. Cl.
*B62D 25/10* (2006.01)
*B62D 27/02* (2006.01)

BODY PANEL ASSEMBLY AND A METHOD FOR MANUFACTURING A BODY PANEL ASSEMBLY

CROSS-REFERENCE TO RELATED APPLICATION

This application claims the benefit of co-pending U.S. patent application Ser. No. 13/220,371 filed 29 Aug. 2011 and entitled "Body Panel Assembly And A Method For Manufacturing A Body Panel Assembly", which is hereby incorporated herein by reference in its entirety.

TECHNICAL FIELD

The technical field generally relates to vehicles, and more particularly relates to a body panel assembly and a method for manufacturing a body panel assembly.

BACKGROUND

Vehicles, including, but not limited to, automobiles, commonly have one or more body panel assemblies which form an outer periphery of the vehicle. Body panel assemblies are also used to form various closures for openings into the vehicle (e.g., door panel, deck lid, and trunk lid). Such body panel assemblies are typically made from metal materials and are therefore vulnerable to corrosion if not protected by paint, an anti-corrosion coating or by some other substance, method or mechanism.

The typical body panel assembly includes an outer panel attached to an inner panel. This double panel construction greatly enhances the strength of the body panel assembly. At the location where the outer panel and the inner panel come together, the outer panel is typically bent like the letter "J" around a lower portion of the inner panel such that different portions of the outer panel sandwich the inner panel. This portion where the outer panel wraps around inner panel is commonly known as the "nose portion" of the body panel assembly. The nose portion of the body panel assembly includes a portion of the outer panel that will be visible from the outside of the vehicle (referred to herein as the "main portion"), a sharply curved portion where the outer panel wraps around the lower edge of the inner panel (referred to herein as the "transitional portion") and an inwardly facing portion of the outer panel that is not visible from outside of the vehicle (referred to herein as the "bent portion").

The bending of the outer panel around the inner panel forms a cavity below a lower edge of the inner panel. The cavity is completely enclosed and is bounded on three sides by an inner surface of the outer panel and bounded on a fourth side by the lower edge of the inner panel. Because the cavity is completely enclosed, when the vehicle is submerged in an anti-corrosive coating (e.g., e-coating), the anti-corrosive coating material can not penetrate into the cavity. As a result, the cavity receives no protection from corrosion.

Conventional construction techniques entail attaching the body panel assemblies to the automobile such that the cavity is located at the lowest point of the body panel assembly. Over time, small amounts of water stemming from precipitation, atmospheric humidity, and other environmental conditions will enter the cavity through very small crevices between the inner panel and the outer panel. Because the cavity is enclosed, once water enters the cavity, it cannot escape. Instead, the water collects at the bottom of the cavity and begins to corrode the outer panel (typically, at the transitional portion). As the water continues to accumulate, it may reach the lower edge of the inner panel which will then also corrode. If left unchecked, eventually the water may form perforations in a lower edge of the body panel assembly. Such perforations are aesthetically displeasing.

Accordingly, it is desirable to provide a body panel assembly that addresses the problem of corrosion caused by water accumulation the cavity. It is further desirable to provide various methods for manufacturing such a body panel assembly. Furthermore, other desirable features and characteristics will become apparent from the subsequent detailed description and the appended claims, taken in conjunction with the accompanying drawings and the foregoing technical field and background.

SUMMARY

A body panel assembly and a method for manufacturing a body panel assembly are disclosed herein.

In a first non-limiting embodiment, the body panel assembly includes, but is not limited to, an inner panel having a lower portion. The body panel assembly further includes an outer panel that is connected to the inner panel. The outer panel has a main portion, a transitional portion, and a bent portion. The main portion and the bent portion are positioned on opposite sides of the lower portion. The main portion, the transitional portion, and the bent portion are arranged to form a cavity having an elongated configuration below the inner panel. The bent portion defines an opening extending therethrough. The opening is positioned at least partially below the lower portion of the inner panel. The opening provides ventilation to the cavity.

In another non-limiting embodiment, a method is disclosed for manufacturing a body panel assembly including an inner panel having a lower portion and an outer panel having a first end, a second end, and an opening extending through the outer panel, the opening being spaced apart from the first end. The method, includes positioning the inner panel over the outer panel such that the lower portion of the inner panel is spaced apart from the opening. The method further includes partially bending a portion of the outer panel around the lower portion of inner panel, the portion including the first end of the outer panel and the opening. The method further includes moving the inner panel towards the second end to a position where the lower portion of the inner panel will avoid substantial obstruction of the opening once the bending of the portion of the outer panel has been completed. The method still further includes completely bending the portion of the outer panel towards the inner panel to form a body panel assembly having an outer panel having a main portion, a transitional portion, and a bent portion. The main portion and the bent portion are positioned on opposite sides of the lower portion of the inner panel. The main portion, the transitional portion and the bent portion form a cavity having an elongated configuration below the inner panel. An opening extends through the bent portion to provide ventilation for the cavity.

In another embodiment, a method is disclosed for manufacturing a body panel assembly including an inner panel having a lower portion and an outer panel having an opening defined therethrough, the opening being spaced apart from an end of the outer panel and a portion of the outer panel being partially bent towards the inner panel to form a bent portion and a transitional portion, the bent portion including the end and the opening. The method includes, but is not limited to, positioning the inner panel and a gauge over the outer panel such that the gauge positions the lower portion of the inner panel in a spaced apart relationship with respect to the transitional portion of the outer panel. The method further includes partially bending the bent portion of the outer panel around the gauge. The method further includes removing the gauge. The method still further includes completely bending the bent portion of the outer panel towards the inner panel to form a body panel assembly having an outer panel having a main portion, the transitional portion, and the bent portion. The main portion and the bent portion are positioned on opposite sides of the lower portion of the inner panel. The main portion, the transitional portion and the bent portion form a cavity having an elongated configuration below the inner panel. An opening extends through the bent portion to provide ventilation for the cavity.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

With respect to the problem described above in the background section of this disclosure, a ventilation hole extending through the body panel assembly into the cavity would provide the accumulated water with a pathway for evaporation and would also permit the anti-corrosive coating to enter and coat the interior portion of the cavity. However, because the cavity of a conventional body panel assembly is very small, a ventilation hole cannot be bored through the body panel assembly into the cavity without deforming the body panel assembly and giving it an aesthetically displeasing appearance.

A body panel assembly is disclosed herein that resolves the problems described above by providing a nose portion having a ventilation hole defined through the bent portion of the outer panel. To provide such a ventilation hole without deforming the body panel assembly, the cavity is elongated. Such elongation results in the bent portion having a length that is substantially longer than the length of bent portions found in conventional body panel assemblies. The lengthened bent portion provides a location for the ventilation hole that will be concealed when viewed from outside of vehicle and thus will have no adverse impact on the aesthetics of the body panel assembly. The ventilation hole provides an access point for anti-corrosion materials to enter the cavity as well as providing an egress point for water evaporating from the cavity.

A further understanding of the above described body panel assembly and an understanding of various methods that may be employed to manufacture such a body panel assembly may be obtained through a review of the illustrations accompanying this application together with a review of the detailed description that follows.

Figure 1:
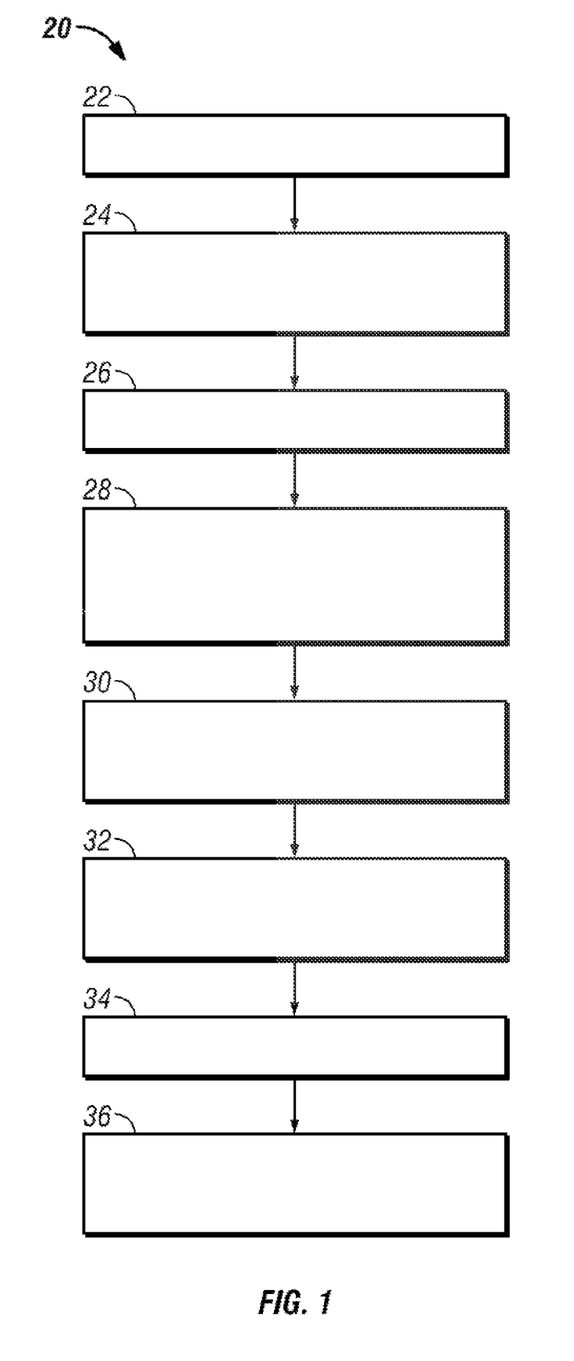
FIG. 1 is a block diagram illustrating a method for manufacturing a body panel assembly.

FIG. 1 is a block diagram illustrating an embodiment of a method 20 for manufacturing a body panel assembly made in accordance with the teachings of the present disclosure and FIGS. 2-5 illustrate the various steps of method 20.

At block 22 an adhesive 38 is applied to an outer panel 40. Adhesives which are suitable for joining inner panels with outer panels to form body panel assemblies are well known in the art and any suitable adhesive effective to join an inner panel with an outer panel may be employed when implementing method 20.

Figure 2:
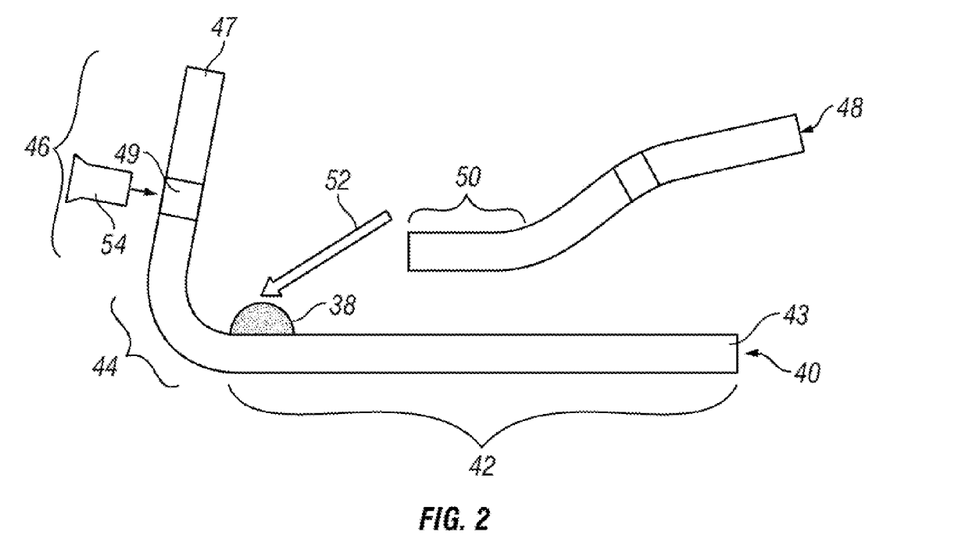
FIG. 2 is a schematic view illustrating an early stage of the method of FIG. 1 wherein an inner panel of the body panel assembly is positioned over an outer panel of the body panel assembly.

It is desirable that adhesive 38 be applied at one or more locations where an inner panel 48 and outer panel 40 will come into contact with one another. As illustrated in FIG. 2, outer panel 40 has been pre-bent and includes a main portion 42, an end 43, a transitional portion 44, a bent portion 46, an end 47, and a ventilation opening 49. It should be understood that although FIG. 2 illustrates outer panel 40 as having a pre-bent configuration, the teachings of method 20 are compatible for use in circumstances where outer panel 40 is not pre-bent, but is instead flat when method 20 is initiated.

In FIG. 2, adhesive 38 has been applied at a location that is spaced apart from transitional portion 44. In other embodiments, adhesive 38 may be applied to a different portion of the outer panel 40 including, but not limited to, transitional portion 44. In other embodiments, adhesive 38 may be applied to multiple portions of outer panel 40. In still other embodiments, adhesive 38 may be applied to one or more portions of inner panel 48. In yet other embodiments, adhesive 38 may be applied to both the outer panel 40 and the inner panel 48.

At block 24, inner panel 48 is positioned over outer panel 40 such that a lower portion 50 of inner panel 48 is spaced apart from end 47 and from ventilation opening 49. In FIG. 2, arrow 52 illustrates the placement of lower portion 50 with respect to outer panel 40. Such placement will ensure that both end 47 and ventilation opening 49 are part of bent portion 46 when outer panel 40 is bent around inner panel 48. In circumstances where outer panel 40 is pre-bent, it may be desirable to position inner panel 48 such that lower portion 50 is positioned proximate transitional portion 44 (as illustrated in FIG. 2). In circumstances where outer panel 40 is flat at the beginning of method 20, the placement of inner panel 48 with respect to outer panel 40 will be determinative of which portions of outer panel 40 will comprise bent portion 46, transitional portion 44, and main portion 42 once outer panel 40 is bent around inner panel 48. Regardless of whether outer panel 40 is pre-bent or flat, it may also be desirable to position inner panel 48 such that lower portion 50 extends into adhesive 38.

At block 26, and as illustrated in FIG. 2, a plug 54 is placed into ventilation opening 49. Plug 54 may be configured and dimensioned to fit snugly into ventilation opening 49. Plug 54 will obstruct adhesive 38 from entering ventilation opening 49 when outer panel 40 is bent around inner panel 48. This will ensure that adhesive 38 does not obstruct the entrance to ventilation opening 49 after method 20 is completed. This will also ensure that adhesive 38 is contained within outer panel 40 while outer panel 40 is bent around inner panel 48. The placement of plug 54 into ventilation opening 49 is temporary and will be removed at a later stage during the implementation of method 20.

Figure 3:
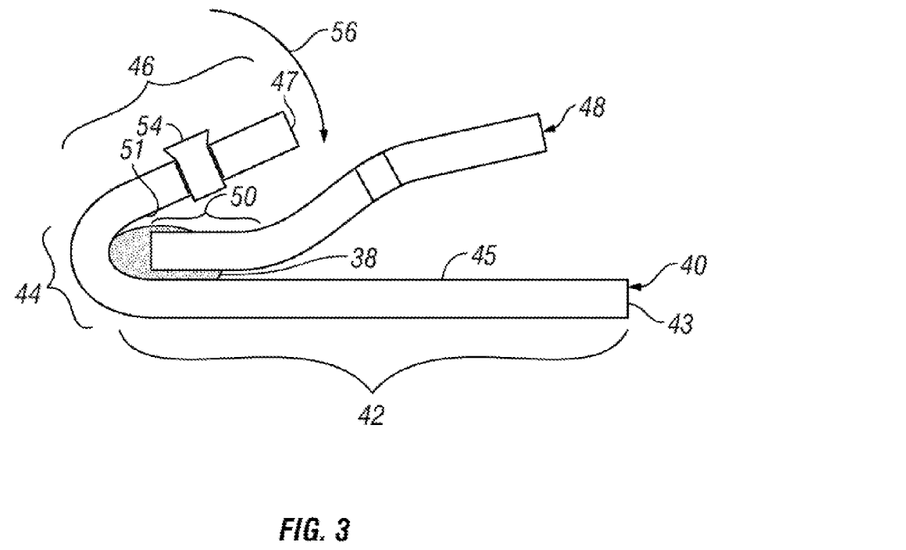
FIG. 3 is a schematic view illustrating a subsequent stage of the method of FIG. 1 wherein a portion of the outer panel is partially bent around an end of the inner panel.

At block 28, and also as illustrated in FIG. 3, bent portion 46 is partially bent around lower portion 50 of inner panel 48. In FIG. 3, bent portion 46 has been bent in the direction indicated by arrow 56. It should be understood that FIG. 3 has been illustrated to depict a gap between inner panel 48 and an inner surface 45 of main portion 42. This is to permit the viewer to see adhesive 38 partially surrounding lower portion 50 of inner panel 48. In practice, inner panel 48 would be pressed up against an inner surface of main portion 42 and would serve as the fulcrum about which outer panel 40 is bent.

As stated above, bent portion 46 is only partially bent at this stage of method 20. As discussed below, inner panel 48 will be moved with respect to outer panel 40 towards end 43. If bent portion 46 were, at this stage, completely bent around inner panel 48, inner panel 48 would be compressed between bent portion 46 and main portion 42 and thereby immobilized. Accordingly, at this stage, bent portion 46 should be bent such that an inner surface 51 of bent portion 46 approaches, but preferably does not contact lower portion 50 of inner panel 48. This will ensure the clearance needed to move inner panel 48.

Figure 4:
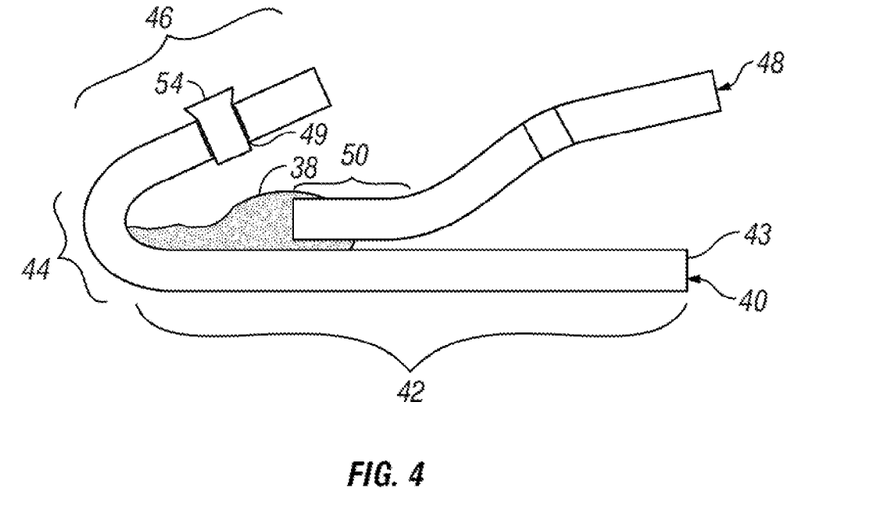
FIG. 4 is a schematic view illustrating a subsequent stage of the method of FIG. 1 wherein the inner panel is moved with respect to the outer panel in a direction away from the bent portion.

At block 30, inner panel 48 is moved with respect to outer panel 40 towards end 43. When moving inner panel 48, it is desirable to position inner panel 48 at a location with respect to outer panel 40 such that lower portion 50 will not obstruct ventilation opening 49 once bent portion 46 has been completely bent against lower portion 50. FIG. 4 illustrates an example of the relative positioning between inner panel 48 and outer panel 40 after inner panel 48 has been moved. As seen in FIG. 4, adhesive 38 has followed lower portion 50 when inner panel 48 was moved. This illustrates the benefit of using plug 54. If plug 54 were not positioned within ventilation opening 49, adhesive 38 might exit through ventilation opening 49 once bent portion 46 is completely bent towards inner panel 48.

Figure 5:
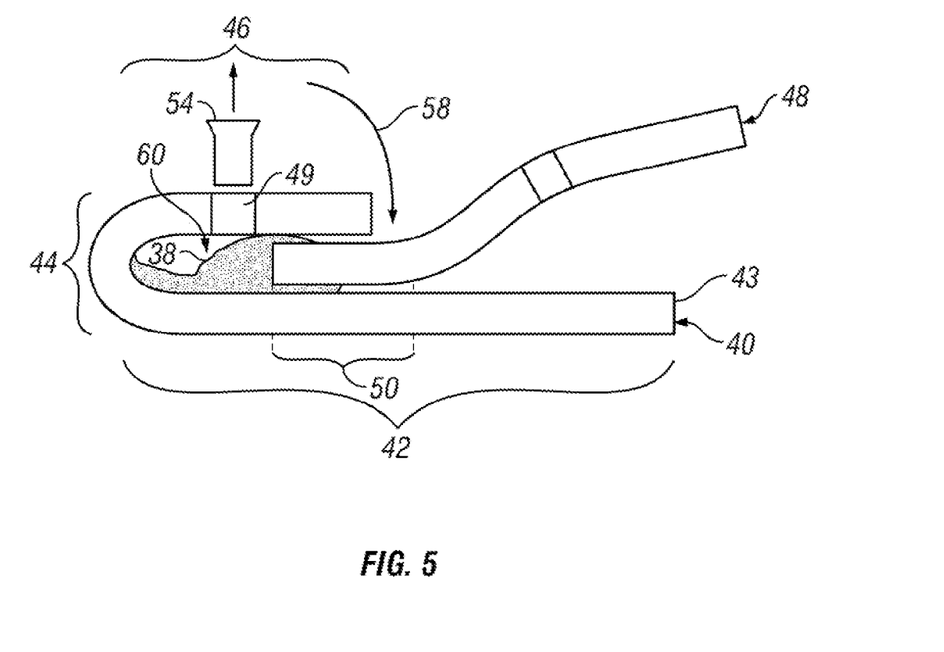
FIG. 5 is a schematic view illustrating a subsequent stage of the method of FIG. 1 wherein the bent portion of the outer panel is completely bent around the end of the inner panel to form the body panel assembly.

At block 32, and as illustrated in FIG. 5, bent portion 46 is completely bent in the direction indicated by arrow 58 towards inner panel 48. With bent portion 46 being completely bent around inner panel 48, bent portion 46 comes into physical contact with, and compresses against, inner panel 48, forming cavity 60. FIG. 5 depicts a space between bent portion 46 and lower portion 50 as well as the space between main portion 42 and lower portion 50. It should be understood that these spaces have been depicted in a greatly exaggerated manner for the purposes of illustrating the role of adhesive 38 in attaching outer panel 40 to inner panel 48. In practice, such spaces between the lower portion 50 of inner panel 48 and the inner surfaces of bent portion 46 and main portion 42 are on the order of approximately 100 microns and therefore would not be visible.

At block 34, plug 54 is removed from ventilation opening 49. This step is also depicted in FIG. 5. The removal of plug 54 permits the passage of fluid into and out of cavity 60.

At block 36, at least a portion of cavity 60 is coated with anti-corrosion material. Such coating may be accomplished during the application of standard anti-corrosion to the vehicle or it may be accomplished during a separate process intended specifically to coat the internal surfaces of cavity 60.

Figure 6:
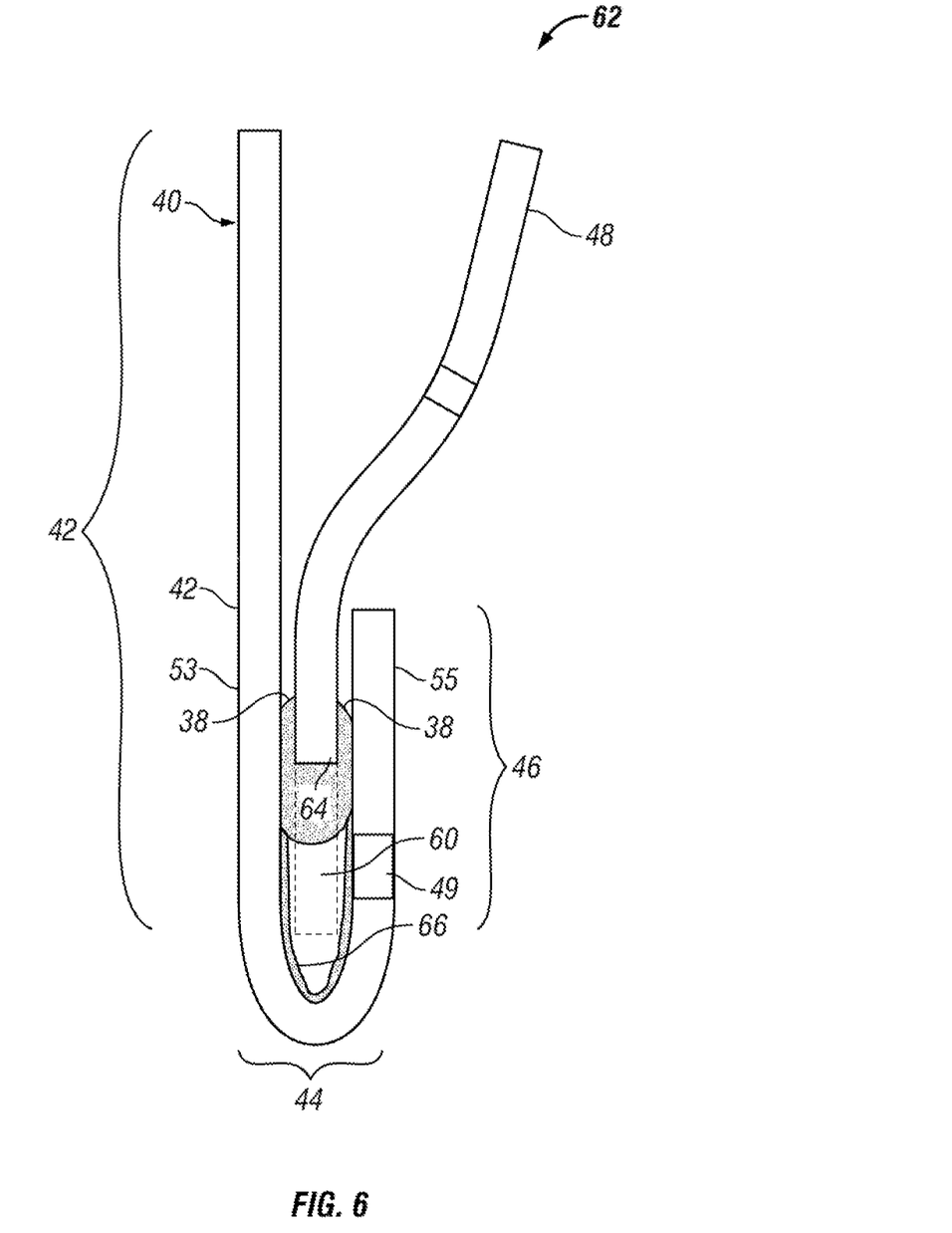
FIG. 6 is a schematic view illustrating a body panel assembly made using the method of FIG. 1.

FIG. 6 is a schematic view illustrating a body panel assembly 62 made using method 20, described above in conjunction with FIGS. 1-5. As illustrated, body panel assembly 62 includes inner panel 48 sandwiched between main portion 42 and bent portion 46 of outer panel 40. Cavity 60 is formed by the internal surfaces of main portion 42, transitional portion 44, bent portion 46, and lower edge 64 of inner panel 48. An outer surface 53 of main portion 42 will be visible from outside of the vehicle to which body panel assembly 62 is attached while an outer surface 55 of bent portion 46 will be concealed. Ventilation opening 49 extends through bent portion 46 into cavity 60 and, due to its position in bent portion 46, ventilation opening 49 will not be visible from outside of the vehicle.

An anti-corrosion coating 66 coats an internal surface of transitional portion 44, where water is anticipated to collect during the life of the vehicle. In the embodiment illustrated in FIG. 6, anti-corrosion coating 66 coats all of the internal surfaces of cavity 60 that are not already covered by adhesive 38. In other embodiments, fewer than all surfaces defining a cavity 60 may be covered with anti-corrosion coating 66.

Also shown in FIG. 6 are phantom lines depicting the outline of a lower portion of an inner panel of a conventional body panel assembly. As illustrated, a conventional body panel assembly does not leave a sufficient gap between a lower edge of the inner body panel and the inner surface of the transitional portion to permit the placement of a ventilation opening without deforming the body panel assembly. By raising the position of lower edge 64 and elongating cavity 60, as shown in body panel assembly 62, there is ample room to define an opening (e.g., ventilation opening 49) through bent portion 46 into cavity 60 without causing deformation of body panel assembly 62.

In FIG. 6, body panel assembly 62 has been illustrated to depict visible gaps between the internal surfaces of bent portion 46 and main portion 42 on the one hand and the outer surfaces of inner panel 48 on the other hand. These gaps have been greatly exaggerated for illustration purposes only to show the presence of adhesive 38 connecting outer panel 40 with inner panel 48. In practice, outer panel 40 and inner panel 48 are attached to one another not only by adhesive 38, but also by a compressive force exerted by bent portion 46 and main portion 42 acting on inner panel 48. In other embodiments, adhesive 38 may act alone to join outer panel 40 with inner panel 48. In still other embodiments, the compression of bent portion 46 and main portion 42 acting on inner panel 48 may be suffice without adhesive 38 to connect outer panel 40 inner panel 48.

Figure 7:
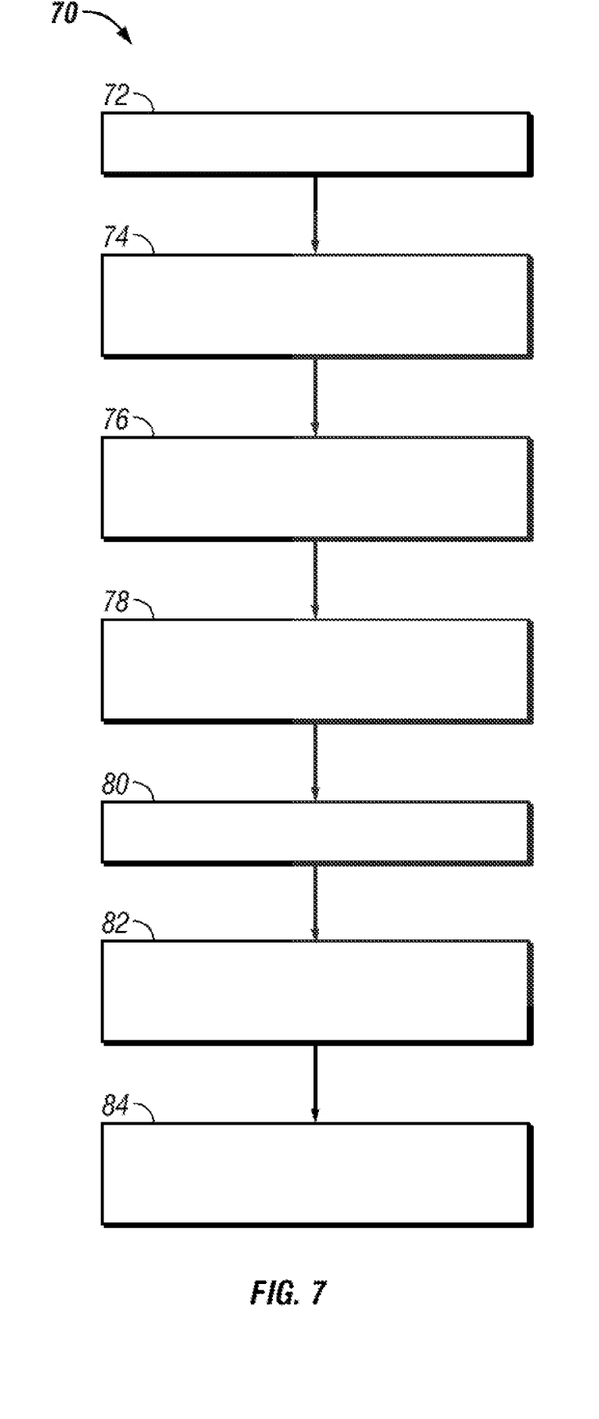
FIG. 7 is a block diagram illustrating another method for manufacturing a body panel assembly.

FIG. 7 is a block diagram illustrating another embodiment of a method 20 for manufacturing a body panel assembly in accordance with the teachings of the present disclosure and FIGS. 8-11 illustrate the various steps of method 70. With continuing reference to FIGS. 1-7, method 70 differs from method 20 primarily in that method 20 does not entail the placement and subsequent movement of an inner panel with respect to an outer panel, but rather, entails the usage of a gauge to provide a predetermined amount of spacing between an inner panel and the transitional portion of an outer panel.

Figure 8:
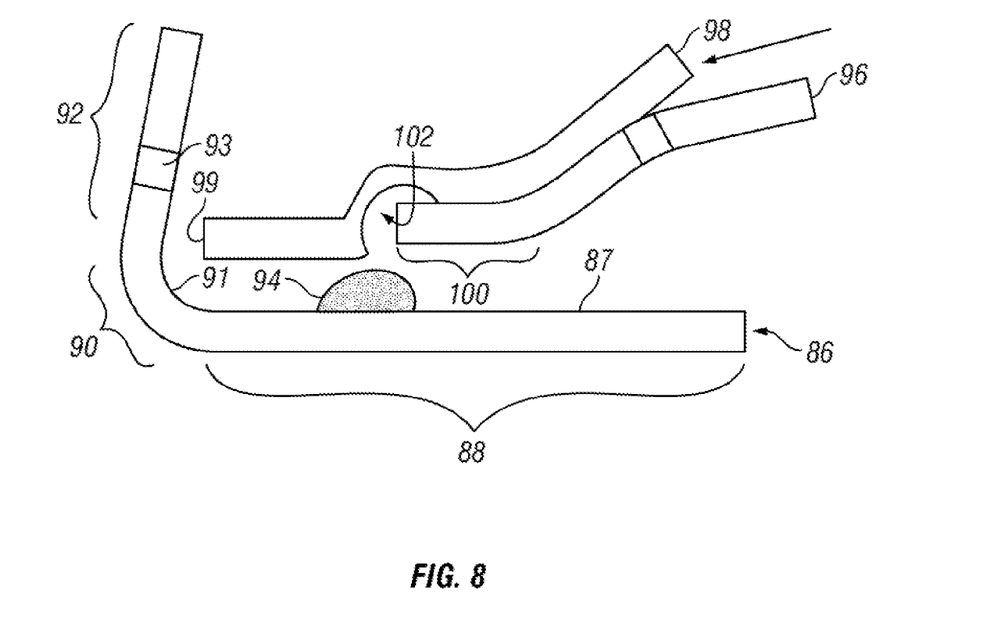
FIG. 8 is a schematic view illustrating an early stage of the method of FIG. 7 wherein an inner panel and a gauge are positioned over an outer panel of the body panel assembly.

As illustrated in FIG. 8, an outer panel 86 is provided having a main portion 88, a transitional portion 90, a bent portion 92, and a ventilation opening 93. While outer panel 86 and outer panel 40 are both illustrated as having a pre-bent configuration at the start of methods 20 and 70, it should be understood that when implementing methods 20 and 70, the outer panel may initially be either pre-bent or flat.

At block 72, adhesive 94 is applied to an internal surface 87 of outer panel 86. As illustrated in FIG. 8, adhesive 94 is spaced apart with respect to transitional portion 90. As with method 20, any adhesive which is suitable for joining inner panels with outer panels to form a body panel assembly may be employed when implementing method 70.

At block 74, and as illustrated in FIG. 8, an inner panel 96 and a gauge 98 are positioned over outer panel 86. Gauge 98 is configured to engage an internal surface 91 of transitional portion 90 for the purpose of positioning a lower portion 100 of inner panel 96 in a spaced apart relationship with respect to transitional portion 90. Gauge 98 is configured to ensure that lower portion 100 of inner panel 96 will be positioned so as not to obstruct ventilation opening 93 once bent portion 92 is completely bent over onto inner panel 96. Gauge 98 includes a pocket 102 to receive adhesive 94, as discussed below. Gauge 98 also has a forward edge 99. In some embodiments of method 70, gauge 98 may have a width (the width extends into the plane of the page on which FIG. 8 is printed) that is substantially equal to the width of outer panel 86. In other embodiments, multiple gauges 98 may be used in conjunction to span the width of outer panel 86.

Figure 9:
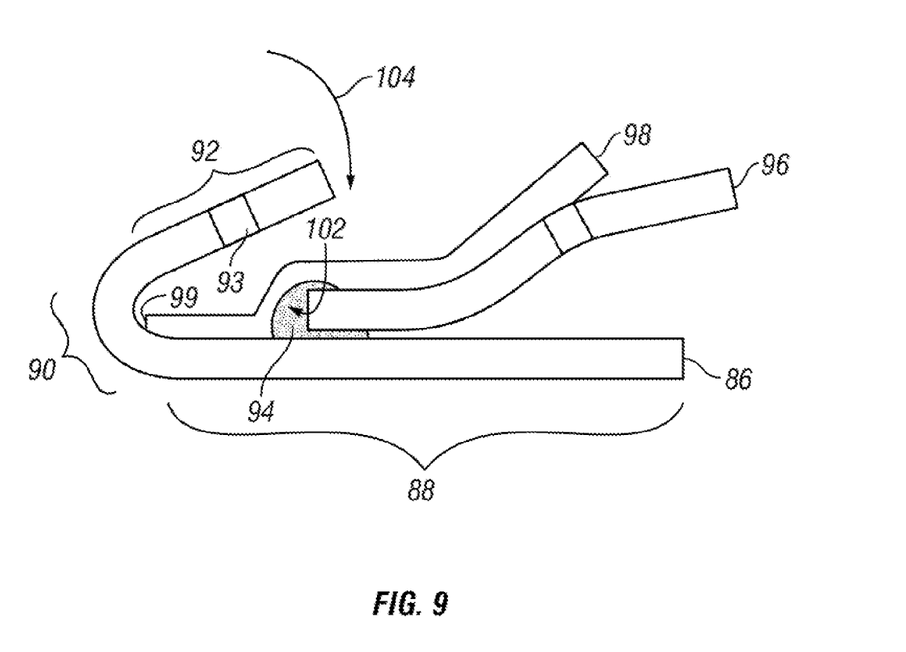
FIG. 9 is a schematic view illustrating a subsequent stage of the method of FIG. 7 wherein a portion of the outer panel is partially bent around an end of the gauge.

At block 76, the flow of adhesive 94 is controlled with gauge 98. This is illustrated in FIG. 9 were adhesive 94 can be seen completely enveloped within pocket 102. In the illustrated embodiment, because of the flat configuration of a forward portion of gauge 98, adhesive 94 is inhibited from flowing out of pocket 102 towards transitional portion 90. Similarly, because of the generally flat configuration of gauge 98 in the area immediately to the rear of pocket 102, adhesive 94 is inhibited from flowing out of pocket 102 towards the rear of inner panel 96. As a result, adhesive 94 is controlled and therefore remains in the vicinity of lower portion 100 of inner panel 96. This ensures that when gauge 98 is removed, adhesive 94 will be available in sufficient amounts to bond bent portion 92 to inner panel 96.

At block 78 of method 70, bent portion 92 is partially bent around gauge 98 in the direction indicated by arrow 104 in FIG. 9. When bending bent portion 92 around gauge 98, forward edge 99 acts as a fulcrum to control the bending of bent portion 92. When partially bending bent portion 92, care must be taken not to bend bent portion 92 too far. Bent portion 92 should be bent to a location that provides sufficient clearance for gauge 98 to be removed.

Figure 10:
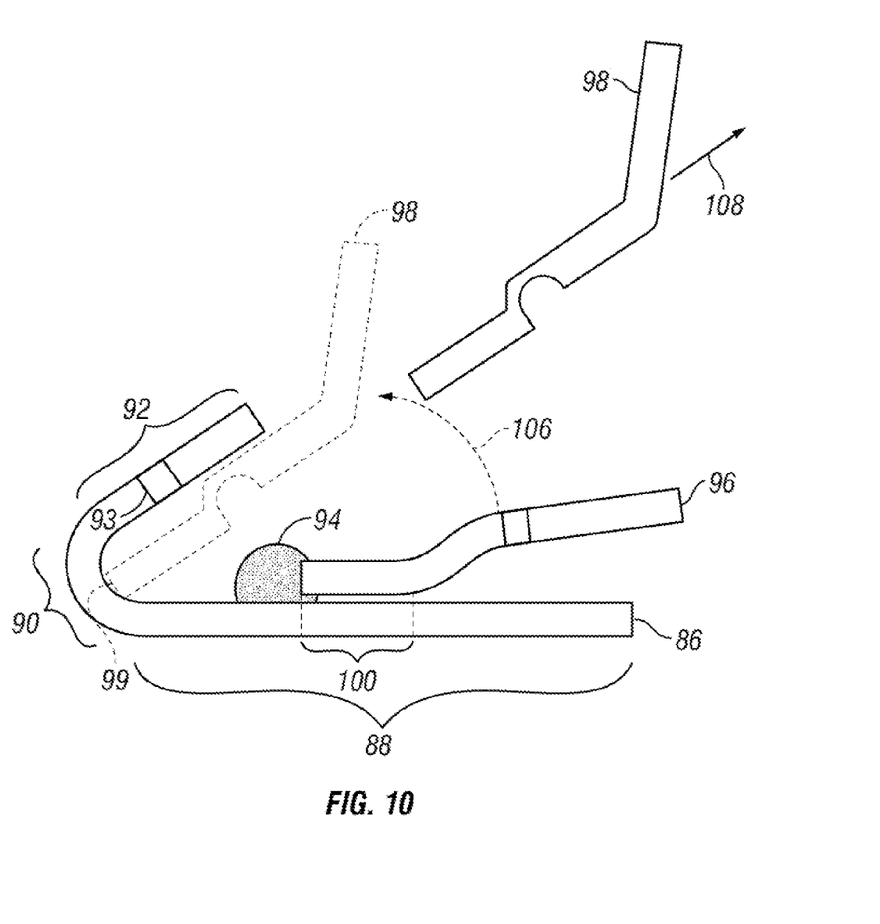
FIG. 10 is a schematic view illustrating a subsequent stage of the method of FIG. 7 wherein the gauge is removed from the assembly of the outer panel and the inner panel.

At block 80, gauge 98 is removed. This step is illustrated in FIG. 10. Initially, gauge 98 is pivoted about forward edge 99 in the direction indicated by arrow 106. Then gauge 98 is pulled in an outward direction as indicated by arrow 108. Due to the controlling influence of pocket 102, adhesive 94 remains in place over both lower portion 100 and an internal surface of main portion 88.

Figure 11:
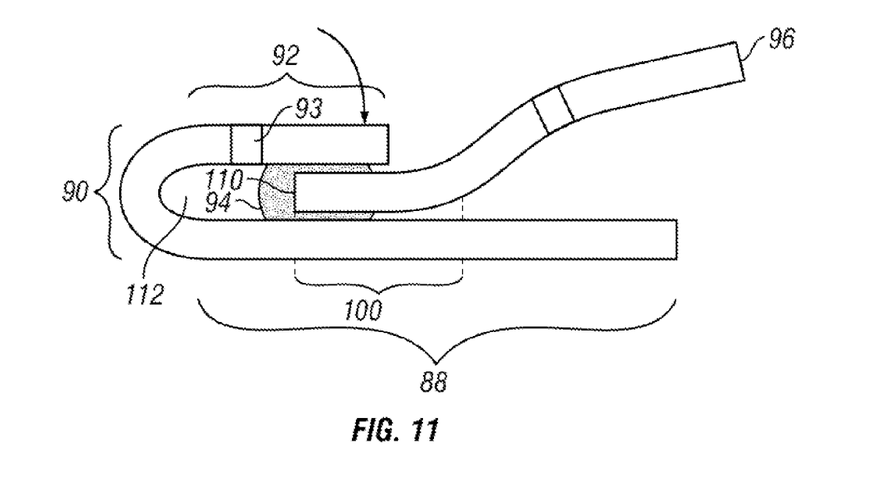
FIG. 11 is a schematic view illustrating a subsequent stage of the method of FIG. 7 wherein the portion of the outer panel is completely bent around an end of the inner panel to form the body panel assembly.

At block 82 of method 70, bent portion 92 is completely bent towards inner panel 96. Once this step is complete, bent portion 92 will compress against lower portion 100 of inner panel 96 and the internal surfaces of bent portion 92, transitional portion 90, main portion 88, and a forward edge 110 of inner panel 96 will form a cavity 112.

At block 84, a portion of cavity 112 is coated with an anti-corrosion material. In some embodiments of method 70, all surfaces within cavity 112 may receive anticorrosion coating while in other embodiments, only selective surfaces may receive such anti-corrosion coating. In some implementations of method 70, the anti-corrosion coating may be applied at the same time that other portions of the vehicle receive anticorrosion coating while in other implementations of method 70, the anti-corrosion coating may be applied as part of a separate and/or distinct process.

It should be understood that although both method 20 and method 70 have been described above as starting with an outer panel that has a pre-formed ventilation opening, each method can be performed with an outer panel that lacks a pre-formed ventilation opening. A ventilation opening can be drilled or otherwise bored through the bent portion of the outer panel after the bent portion has been completely bent and is compressed against the inner panel without departing from the teachings of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for manufacturing a body panel assembly, the body panel assembly including an inner panel having a lower portion and an outer panel having a first end, a second end, and an opening extending through the outer panel, the opening being spaced apart from the first end, the method comprising the steps of:
   positioning the inner panel over the outer panel such that the lower portion of the inner panel is spaced apart from the opening;
   partially bending a portion of the outer panel around the lower portion of the inner panel, the portion including the first end of the outer panel and the opening;
   moving the inner panel towards the second end to a position where the lower portion of the inner panel will avoid obstruction of the opening once the bending of the portion of the outer panel has been completed; and
   completely bending the portion of the outer panel towards the inner panel to form the body panel assembly having the outer panel having a main portion, a transitional portion, and a bent portion, the main portion and the bent portion being positioned on opposite sides of the lower portion of the inner panel, the main portion, the transitional portion and the bent portion forming a cavity having an elongated configuration below the inner panel, and the opening extending through the bent portion to provide ventilation for the cavity.

2. The method of claim 1, further comprising the step of applying an adhesive to the body panel assembly to attach the inner panel to the outer panel.

3. The method of claim 2, wherein the step of applying the adhesive to the body panel assembly comprises applying the adhesive to a surface of the outer panel corresponding to the main portion of the outer panel.

4. The method of claim 2, wherein the step of applying the adhesive to the body panel assembly comprises applying the adhesive to a surface of the outer panel corresponding to the main portion of the outer panel at a location proximate the transitional portion.

5. The method of claim 2, wherein the step of applying the adhesive to the body assembly comprises applying the adhesive in an amount sufficient to coat at least portions of opposite sides of the inner panel.

6. The method of claim 2, further comprising the steps of:
positioning a plug in the opening prior to the completely bending step; and
removing the plug from the opening subsequent to the completely bending step.

7. The method of claim 1, further comprising the step of at least partially coating the cavity with an anti-corrosion material.

8. The method of claim 7, wherein the step of at least partially coating the cavity with an anti-corrosion material comprises coating at least portions of oppositely disposed inner walls of the bent portion and the main portion, respectively.

9. The method of claim 1, wherein the step of moving the inner panel towards the second end comprises moving the inner panel to a position where the lower portion of the inner panel will avoid any obstruction of the opening once the bending of the portion of the outer panel has been completed.

10. The method of claim 1, wherein the step of completely bending the portion of the outer panel comprises bending the portion of the outer panel such that the bent portion and the main portion compress against opposite sides of the inner panel.

11. A method for manufacturing a body panel assembly, the body panel assembly including an inner panel having a lower portion and an outer panel having an opening defined therethrough, the opening being spaced apart from an end of the outer panel and a portion of the outer panel being partially bent towards the inner panel to form a bent portion and a transitional portion, the bent portion including the end and the opening, the method comprising the steps of:
positioning the inner panel and a gauge over the outer panel such that the gauge positions the lower portion of the inner panel in a spaced apart relationship with respect to the transitional portion of the outer panel;
partially bending the bent portion of the outer panel around the gauge;
removing the gauge; and
completely bending the bent portion of the outer panel towards the inner panel to form the body panel assembly having the outer panel having a main portion, the transitional portion, and the bent portion, the main portion and the bent portion being positioned on opposite sides of the lower portion of the inner panel, the main portion, the transitional portion and the bent portion forming a cavity having an elongated configuration below the inner panel, and the opening extending through the bent portion to provide ventilation for the cavity.

12. The method of claim 11, further comprising the step of applying an adhesive to the body panel assembly to attach the inner panel to the outer panel.

13. The method of claim 12, wherein the step of applying the adhesive to the body panel assembly comprises applying the adhesive to a surface of the outer panel corresponding to the main portion of the outer panel.

14. The method of claim 12, further comprising controlling a flow of the adhesive using the gauge.

15. The method of claim 12, wherein the step of applying the adhesive to the body assembly comprises applying the adhesive in an amount sufficient to coat at least portions of opposite sides of the inner panel.

16. The method of claim 12, further comprising the step of at least partially coating the cavity with an anti-corrosion material.

17. The method of claim 16, wherein the step of at least partially coating the cavity with an anti-corrosion material comprises coating at least portions of oppositely disposed inner walls of the bent portion and the main portion, respectively.

18. The method of claim 11, wherein the step of positioning the inner panel and the gauge over the outer panel comprises positioning the inner panel at a location where the lower portion of the inner panel will avoid obstruction of the opening once the bending of the portion of the outer panel has been completed.

19. The method of claim 11, wherein the step of positioning the inner panel and the gauge over the outer panel comprises positioning the inner panel at a location where the lower portion of the inner panel will avoid any obstruction of the opening once the bending of the portion of the outer panel has been completed.

20. The method of claim 11, wherein the step of completely bending the portion of the outer panel comprises bending the portion of the outer panel such that the bent portion and the main portion compress against opposite sides of the inner panel.

* * * * *